UNITED STATES PATENT OFFICE.

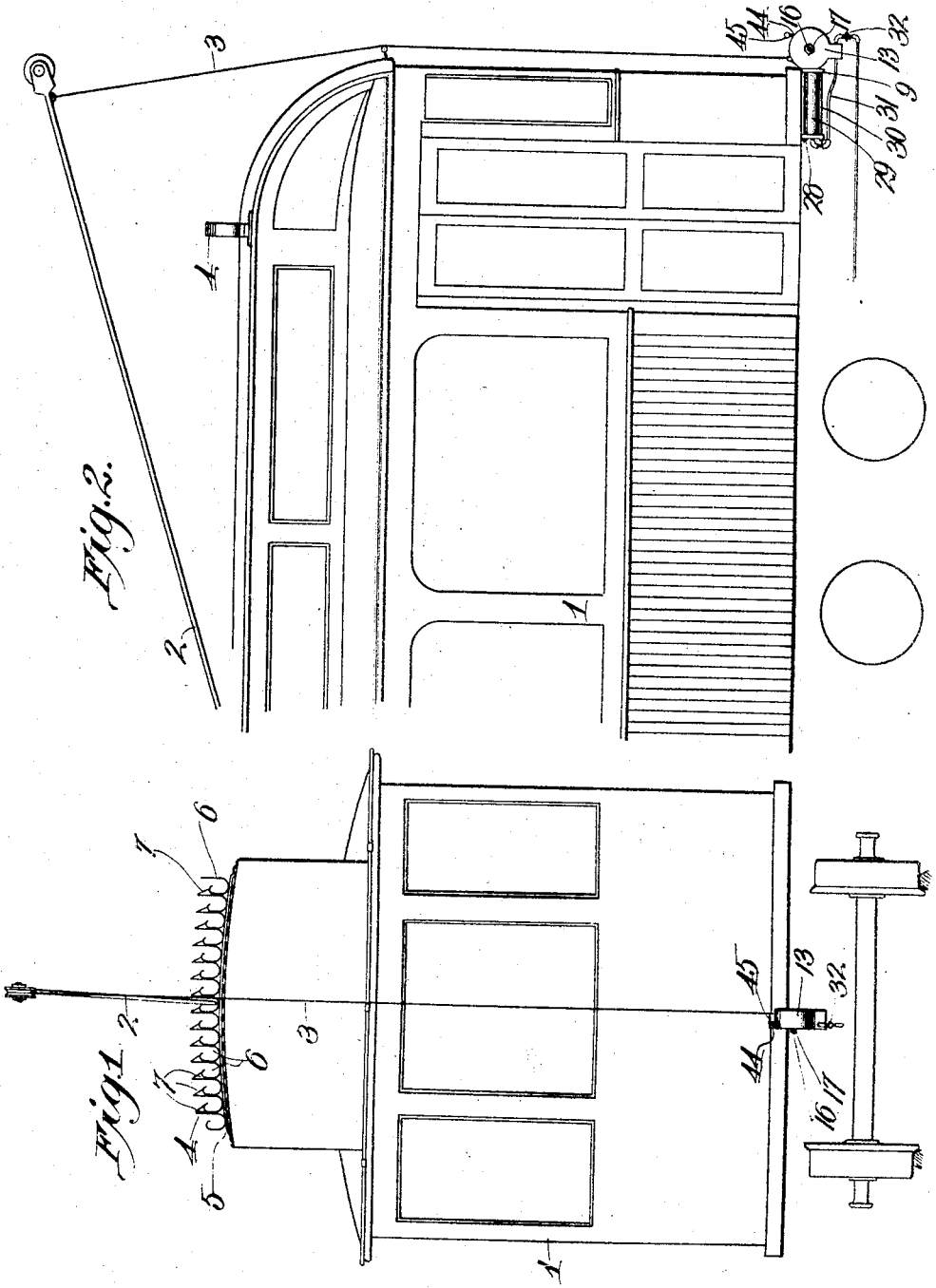

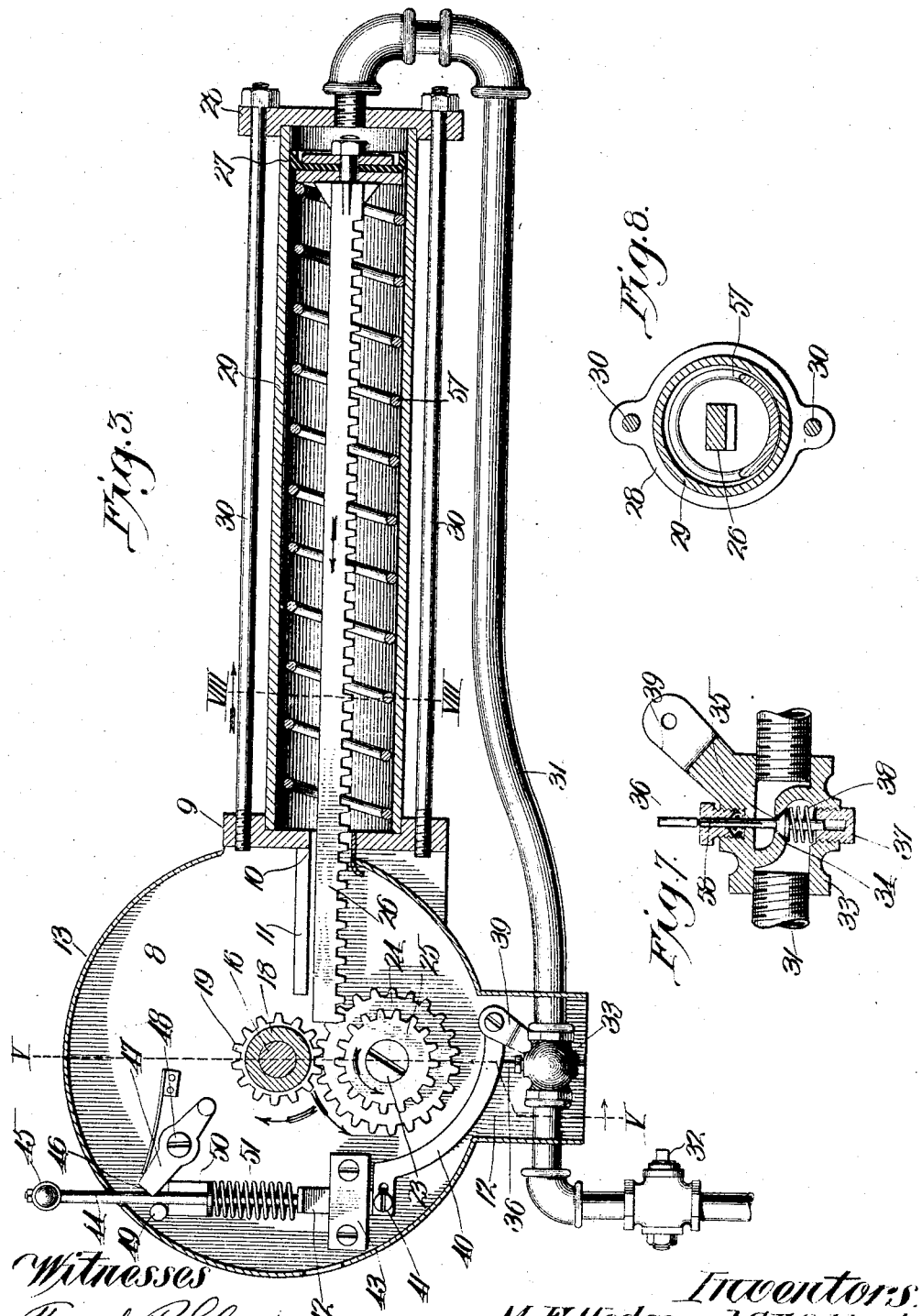

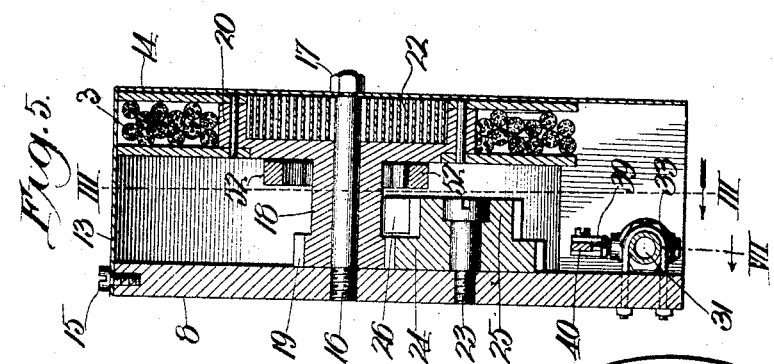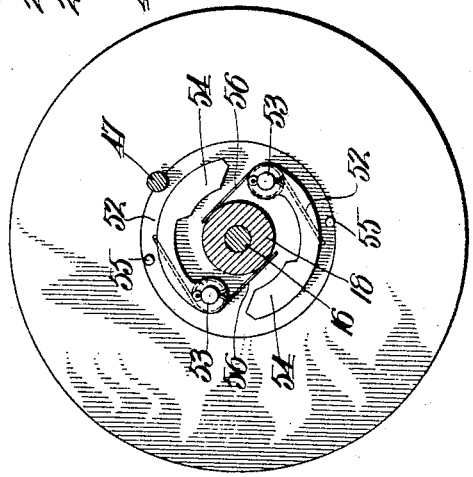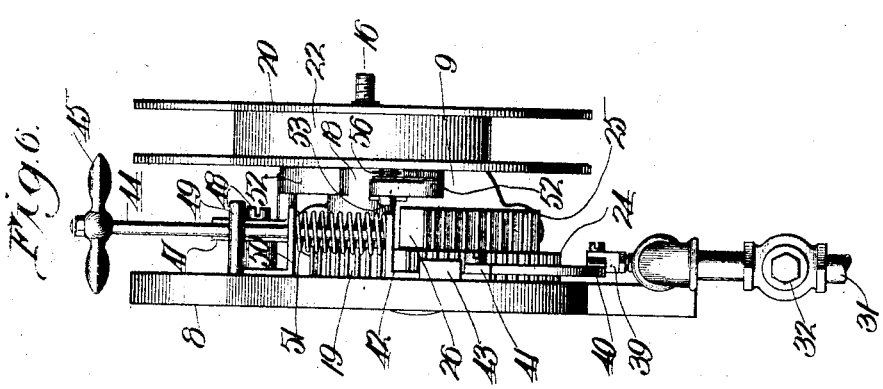

CHARLES E. SCHLAGLE, OF WOLCOTT, AND MADISON F. HODGE, OF LEAVENWORTH, KANSAS.

TROLLEY-RETRIEVER.

954,139.  Specification of Letters Patent.  Patented Apr. 5, 1910.

Application filed January 4, 1909. Serial No. 470,715.

*To all whom it may concern:*

Be it known that we, CHARLES E. SCHLAGLE and MADISON F. HODGE, citizens of the United States, residing, respectively, at Wolcott, county of Wyandotte, and Leavenworth, Leavenworth county, and State of Kansas, have invented certain new and useful Improvements in Trolley-Retrievers, of which the following is a specification.

This invention relates to trolley retrievers and catchers and has for its object to produce a device of this character in which air, under pressure, is utilized to effect the practically-instantaneous lowering of the trolley-pole after jumping the trolley wire.

A further object is to produce a trolley catcher, wherewith the pole can be readily engaged and held in depressed or inoperative position and from which it can be instantly disengaged by simply pulling down upon and releasing the trolley rope or cable.

With these and other objects in view, as hereinafter appear, the invention consists in certain novel and peculiar features of construction and combinations of parts hereinafter described and claimed; and in order that it may be fully understood reference is to be had to the accompanying drawings, in which:

Figure 1, is a rear-end view of a trolley car equipped with our improvements. Fig. 2, is a side view of the same. Fig. 3, is a vertical section taken on the line III—III of Fig. 5. Fig. 4, is a section taken on substantially the same line as Fig. 3, but viewed in the opposite direction. Fig. 5, is a section taken on the line V—V of Fig. 3. Fig. 6, is an end view of the construction shown in Fig. 3, with the casing omitted. Fig. 7, is an enlarged section taken on the dotted line VII of Fig. 5, but on a larger scale. Fig. 8, is a section on the line VIII—VIII of Fig. 3.

In the said drawing where like reference characters identify corresponding parts, 1 indicates a trolley-car, 2 the trolley-pole, 3 the cable whereby the conductor lowers the pole and 4 a catcher for holding the pole in its lowered position, said catcher being constructed as follows; 5 is a bar extending transversely of and secured upon the top of the car over the vestibule, and secured to said bar is a second bar which is bent to form a plurality of J-shaped figures 6, arranged side by side transversely across the car, the upper end of the stem of each J-shaped figure being connected by an oblique portion 7 to the hook-terminal of the adjacent J-shaped figure, said oblique portions diverging upwardly with respect to the stem-portions of the J-shaped figures from whose hook-terminals said oblique portions project, so as to form a flaring mouth for each J-shaped figure, to facilitate the entrance therein of the trolley-pole when pulled downward its full distance. It will be apparent that when the conductor pulls the cable downward a sufficient distance, the pole will be swung downward through the flaring mouth of and into one of the J-shaped figures and eventually strike and be deflected laterally by that part of the semi-circular lower end of the figure which underlies the contracted portion of said flaring mouth. As it strikes and is thus deflected laterally by said part, the pull on the cable is relaxed so as to permit the pole as it immediately starts upward under the force of its actuating spring, not shown, to be carried on by the impetus of its deflection to one side of the plane of the contracted mouth and below the hook terminal, the pole therefore, in the initial part of its upward movement, following a direction which diverges upward slightly from the plane of its downward movement. In other words, the pole when thus pulled downward into the J-shaped figure and released at the proper moment, follows a V-shaped course, the terminal of the hook arresting the upward movement and holding the pole reliably in its depressed or inoperative position. To release the trolley pole, the cable is pulled downwardly until it strikes that part of the semi-circular lower end of the J-shaped figure, which underlies the hook-terminal, said portion of the figure deflecting the pole toward the stem of the figure. At the proper moment the pull on the cable is relaxed so that in such deflection, the pole, as it starts upward under the power of the spring as the cable is relaxed, is carried by its impetus of deflection still farther toward the stem until it is in vertical alinement with the contracted portion of the flaring mouth up through which it passes in its upward movement.

By providing a plurality of the J-shaped figures it will be apparent that the trolley-pole can be secured in its depressed position even if not occupying its normal plane, that is the plane of the longitudinal center of the car, and thus avoid the necessity of the conductor manipulating the pole laterally so as to insure its engagement with the catch.

Referring now to the retriever mechanism; 8 indicates a circular plate cast integral, by preference, with and at right-angles to a cylinder head 9, having an opening 10 at the inner side of said plate and a guard-rib 11 in the plane of the upper side of the opening 10, the opening in said head being disposed below the axial center of the plate which is equipped, below its center, with a depending arm 12.

13 is a cylindrical sheet-metal casing provided with a head or wall 14 at one end, the plate 8 forming the opposite head or wall, the casing and plate 8 being secured together by a plurality of screw-bolts 15, and a cylindrical axle or shaft 16 secured to and projecting centrally from plate 8 and extending through the head 14 of the casing and engaged at its outer end by a nut 17 which prevents said head or wall 14 from buckling outward.

Journaled upon shaft 16 is a tubular shaft 18 equipped at its end adjacent to plate or head 8 with a cog-wheel 19 and at its opposite end with a cylindrical drum 20 to receive the cable 3 connected to the trolley-pole, the inner end of the cable being secured in any suitable manner, (not shown) to the drum, as customary in trolley catchers and retrievers. In the hollow portion or chamber of the drum is a barrel-spring 22 secured at one end to the drum and at the other to the shaft 16 or other fixed point, the tendency of said spring being to resist rotation of the drum tending to unwind the cable therefrom. The drawing does not show the ends of the spring fastened as explained as the method of making such connections is old and well known in trolley retrievers.

23 is a stud-bolt carried by plate or head 8 and forming a journal for a cog-wheel 24 meshing with cog-wheel 19, and a smaller cog-wheel 25 rigid with cog-wheel 24, and meshing with a rack-bar 26 extending through opening 10 of cylinder head 9 and under guard-rib 11, and secured on the opposite end of the rack-bar is a piston 27 for a cylinder, consisting of head 9, head 28 and a cylindrical body-portion 29, the said parts being secured together by tie-rods 30.

31 indicates a pipeway leading from a compressed-air tank (not shown) on the car, to the outer end of the cylinder and provided with a cut-off valve 32 between the tank and the cylinder. Said pipeway is also provided with a coupling 33 forming a valve-casing provided with a perforated diaphragm 34.

35 is a valve having a stem 36 projecting upwardly through the perforated diaphragm and the casing, and downward into a removable cup 37 carried by the casing, a helical spring 38 interposed between the valve and said cup, holding the former yieldingly on its seat. The valve-casing is provided with an upwardly-projecting arm 39, and pivoted to said arm is a curved lever 40 having a pin-and-slot connection at 41 with the lower end of a slide-bar 42 mounted in a keeper 43 secured to plate or head 8, and extending upward from said slide-bar 42 through the body-portion of the casing 13, is a rod 44 equipped with a handle 45 at its upper end, and provided within the casing with a notch 46 normally engaged by a spring-actuated catch 47 pivoted at 48 to the plate or head 8, a pin 49 also projecting from said plate or head serving to stiffen or brace the rod and thus guard against the same springing out of engagement with the catch. The rod extends through the bracket 50 secured to the plate or wall 8, and a spring 51 surrounds the rod and bears at its upper and lower ends respectively, against bracket 50 and slide-bar 42 for the purpose of forcing rod 44 downward when disengaged from the catch, as hereinafter explained, and through the instrumentality of lever 40 unseating valve 35 to permit air to pass from the tank hereinbefore referred to, into the outer end of the cylinder and force the piston inward, for a purpose which hereinafter appears.

To trip the catch 47, a pair of arms 52 are pivoted at diametrically opposite points as at 53 to the drum 20, the free ends of said arms being weighted by preference, by enlarging them or otherwise as at 54, pins 55 projecting from the drum, limiting the outward swing of the arms which are held pressed inwardly at their free ends, by springs 56.

Assuming that the parts are arranged as described and that the trolley wheel jumps the wire, and in starting upward, starts to unwind the cable, it will be seen that the drum will be revolved against the resistance of spring 22, and through centrifugal force, the weighted arms 52 will swing outward, one of them in such action, striking the inner end of catch 47 and tripping it from engagement with notch 46 of rod 44. The instant this occurs spring 51 forces said rod downward, and through lever 40, as hereinbefore explained, unseats valve 35 and permits air, under pressure, to force piston 27 in the direction indicated by the arrow on the rack-bar, and thus cause said rack-bar to engage cog-wheel 25 and rotate the same and hence the connected cog-wheel 24, to cause the latter to turn wheel 19 in opposition to the movement imparted to it and the drum by the unwinding of the cable, for the purpose of rewinding the latter upon the drum and therefore, pulling the trolley-pole downward, this rewinding movement being sufficient to withdraw the trolley wheel below the plane of the trolley wire and the cross wires supporting the same, which wires are omitted from the drawing, it being noticed that the spring 22 coöperates with the air in pulling the trolley-pole downward, the chief function of said spring being to hold the cable taut at all times. To permit the trolley pole to swing upward and effect reëngagement of the trolley wheel with the trolley wire, the conductor grasps handle 45 and pulls rod 44 upward to withdraw lever 40 from engagement with valve-stem 36. As this is accomplished, the valve is reseated by spring 38 to cut off the pressure of air on the piston and permit spring 57 within the cylinder to return the piston and rack-bar and hence the parts geared thereto to their original positions, the air between the piston and valve 35, escaping into the atmosphere through the vent-passage or groove 58 provided for the purpose, in the upper part of the stem 36 of valve 35, it being understood that spring 57 is compressed or tensioned when the piston is caused to operate under the pressure of air supplied through pipe 31, and that the spring-actuated catch 47 snaps into the notch 46 of rod 44 when the latter is pulled upward, as explained, by the operator, and locks said rod in its elevated or initial position.

From the above description it will be apparent that we have produced a trolley retriever and catcher which embodies the features of advantage enumerated as desirable, and which is obviously susceptible of modification in various particulars without departing from the spirit and scope or sacrificing any of the advantages of the appended claims.

Having thus described the invention what we claim as new and desire to secure by Letters-Patent is:—

1. In a device of the character described, a winding drum, a trolley-pole cable wound upon the drum, a cylinder, a piston therein, means whereby movement of the piston in one direction shall impart rotation to the drum, a spring tending to turn the drum in the same direction to hold the cable taut, a pipeway to conduct air, under pressure to the cylinder to operate the piston, a yieldingly-seated valve normally preventing the passage of air, under pressure, through said pipeway to the cylinder, yielding-means normally holding the piston near the end of the cylinder from which it is moved by air, under pressure, spring-actuated means to unseat said valve, a catch normally holding said means withdrawn to permit the valve to be seated, and means actuated by rotation of the drum imparted by the cable in unwinding, to trip said catch to permit the valve to be unseated to permit the piston to be operated by air, under pressure, and reverse the rotation of the drum and rewind the cable thereon.

2. In a device of the character described, a winding drum, a trolley-pole cable, wound upon the drum, a cylinder, a piston therein, means whereby movement of the piston in one direction shall impart rotation to the drum, a spring tending to turn the drum in the same direction to hold the cable taut, a pipeway to conduct air, under pressure, to the cylinder to operate the piston, a yieldingly-seated valve normally preventing the passage of air, under pressure, through said pipeway to the cylinder, yielding-means normally holding the piston near the end of the cylinder from which it is moved by air, under pressure, spring-actuated means to unseat said valve, a catch normally holding said means withdrawn to permit the valve to be seated, and centrifugally-operated means rotatable with the drum, adapted in the unwinding movement of the latter, to swing outward and trip said catch to permit the valve to be unseated to permit the piston to be operated by air, under pressure, and reverse the rotation of the drum and rewind the cable thereon.

3. In a device of the character described, a winding drum, a trolley-pole cable wound upon the drum, a cylinder, a piston therein, means whereby movement of the piston in one direction shall impart rotation to the drum, a spring tending to turn the drum in the same direction to hold the cable taut, a pipeway to conduct air, under pressure, to the cylinder to operate the piston, a yieldingly-seated valve normally preventing the passage of air, under pressure, through said pipeway to the cylinder, yielding-means normally holding the piston near the end of the cylinder, from which it is moved by air, under pressure, spring-actuated means to unseat said valve, a catch normally holding said means withdrawn to permit the valve to be seated, and an arm pivoted to and held pressed yieldingly toward the axis of the drum adapted in the unwinding rotation of the latter, to swing outward and trip said catch to permit the said valve to be unseated to permit air, under pressure, to pass through said pipeway into the cylinder.

4. In a device of the character described, a winding drum, a trolley-pole cable, wound upon the drum, a cylinder, a piston therein, means whereby movement of the piston in one direction shall impart rotation to the drum, a spring tending to turn the drum in the same direction to hold the cable taut, a pipeway to conduct air, under pressure, to the cylinder to operate the piston, a yieldingly-seated valve normally preventing the passage of air, under pressure, through said pipeway to the cylinder, yielding-means normally holding the piston near the end of the cylinder from which it is moved by air, under pressure, spring-actuated means to unseat said valve, a catch normally holding said means withdrawn to permit the valve to be seated, means whereby the means which unseats the valve may be withdrawn, to its original position to permit the valve to be reseated, and means to cause said catch to reengage the valve-unseating-means and hold the same withdrawn from the valve.

5. In a device of the character described, a shaft, a drum journaled thereon, a trolley-pole cable wound upon the drum, a spring tending to turn the drum to hold the said cable taut, a train of gearing rotatable with the drum, a cylinder, a piston therein provided with a rack-bar stem for engagement with one of said gears, a pipeway communicating with the cylinder and adapted to conduct air, under pressure, into the cylinder to operate the piston and thus cause the rack-bar stem to engage said gear and rotate the drum in the proper direction to wind the cable thereon, a valve controlling said pipeway, yielding-means holding the valve seated, yieldingly-actuated means to unseat said valve, a catch engaging said means to hold the same withdrawn to permit the valve to be seated, means actuated by the rotation imparted to the drum through the unwinding of the cable to trip said catch to permit said yieldingly-actuated means to unseat the valve and means to return the piston to its original position after the valve is seated.

6. In a device of the character described, a shaft, a drum journaled thereon, a trolley-pole cable wound upon the drum, a spring tending to turn said drum to hold the said cable taut, a train of gearing rotatable with the drum, a cylinder, a piston therein provided with a rack-bar stem for engagement with one of said gears, a pipeway communicating with the cylinder and adapted to conduct air, under pressure, into the cylinder to operate the piston and thus cause the rack-bar stem to engage said gear and rotate the drum in the proper direction to wind the cable thereon, a valve controlling said pipeway, yielding-means holding the valve seated, yieldingly-actuated means to unseat said valve, a catch engaging said means to hold the same withdrawn to permit the valve to be seated, means actuated by the rotation imparted to the drum through the unwinding of the cable to trip said catch to permit said yieldingly-actuated means to unseat the valve, means to return the piston to its original position after the valve is seated, means whereby said yieldingly-actuated means may be withdrawn from the path of the valve, and means to cause the catch to reëngage and hold said yieldingly-actuated means in its original or inoperative position.

7. In a device of the character described, a drum, a trolley-pole cable wound upon the drum, a cylinder, a piston therein, means whereby movement of the piston in one direction shall impart rotation to the drum, a spring tending to turn the drum in the same direction to hold the cable taut, a pipeway to conduct air, under pressure, to the cylinder to operate the piston, and provided with a vent-passage, a yieldingly-seated valve controlling said pipeway at the opposite side of the vent-passage from the cylinder, yielding means normally holding the piston near the end of the cylinder from which it is moved by air, under pressure, spring-actuated means to unseat said valve, a catch normally holding said means withdrawn to permit the valve to be seated and means whereby rotation of the drum imparted by the cable in unwinding, shall trip said catch to permit the valve to be unseated and the piston to be operated by air, under pressure, to reverse the rotation of the drum and rewind the cable thereon.

8. In a device of the character described, a drum, a trolley-pole cable, wound upon the drum, a cylinder, a piston therein, means whereby movement of the piston in one direction shall impart rotation to the drum, a spring tending to turn the drum in the same direction to hold the cable taut, a pipeway to conduct air, under pressure, to the cylinder to operate the piston, and provided with a vent-passage, a yieldingly-seated valve controlling said pipeway at the opposite side of the vent-passage from the cylinder, yielding-means normally holding the piston near the end of the cylinder from which it is moved by air, under pressure, a lever suitably fulcrumed and adapted for engagement with the stem of said valve to unseat the latter, a rod connected to said lever and provided with a notch, a catch suitably pivoted, a spring holding the catch in yielding engagement with said notch, a spring to impart movement to said rod and lever when the catch is tripped from said notch, to cause the lever to engage said stem and unseat the valve, a handle whereby said rod and lever may be restored to their original positions, a spring within the cylinder to return the piston to its original position and means actuated by movement imparted to the drum by the unwinding of the cable therefrom, for tripping said catch.

In testimony whereof we affix our signatures, in the presence of two witnesses.

CHARLES E. SCHLAGLE.
MADISON F. HODGE.

Witnesses:
J. J. KELLER,
W. R. DAVIS.